H. RUNNE.
VENEER JOINTING MACHINE.
APPLICATION FILED JULY 25, 1912. RENEWED AUG. 20, 1915.
1,154,730.
Patented Sept. 28, 1915.
4 SHEETS—SHEET 1.
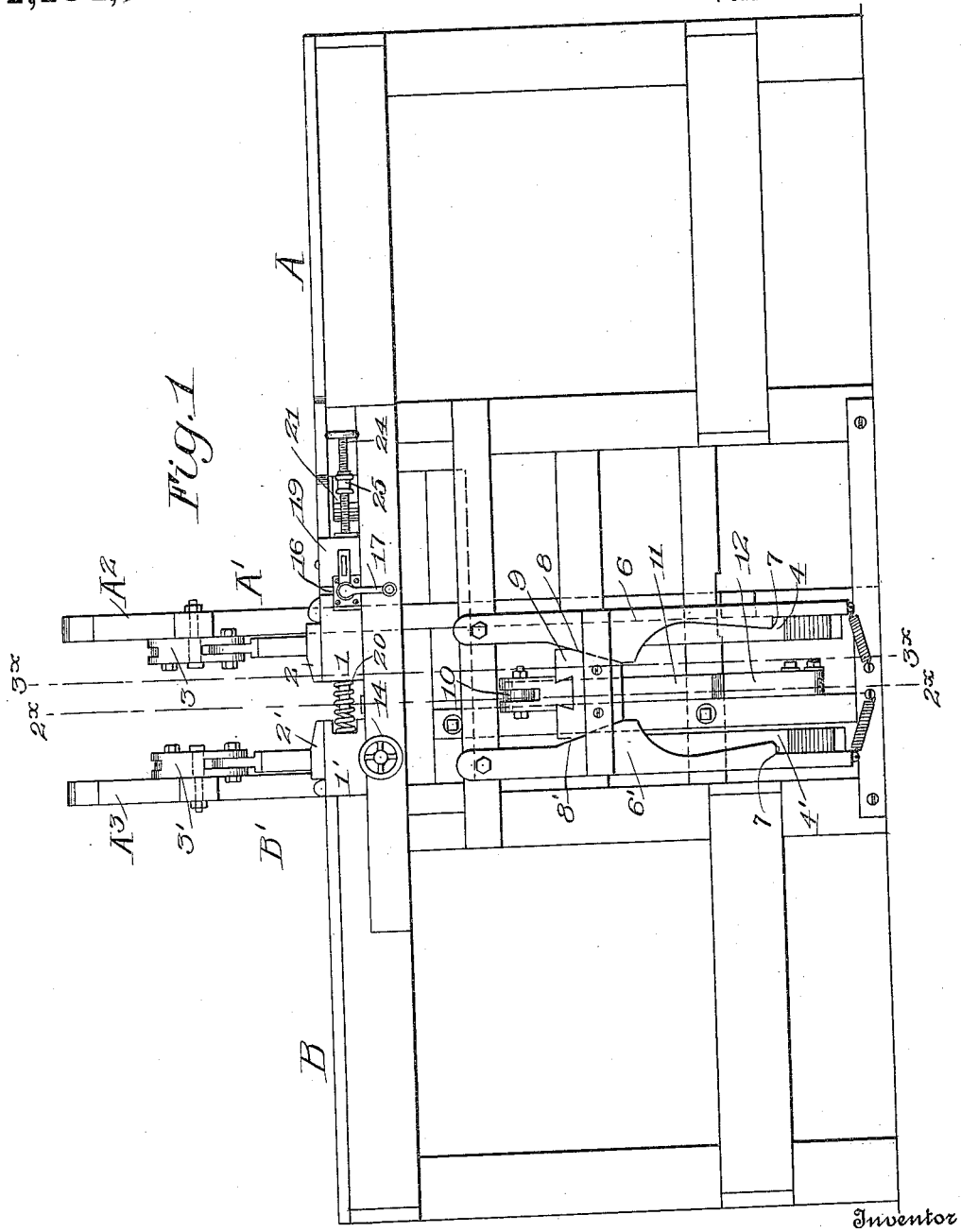
Witnesses
Nelson H. Copp
Walter B. Payne
Inventor
Henry Runne
By Church Rich
His Attorney

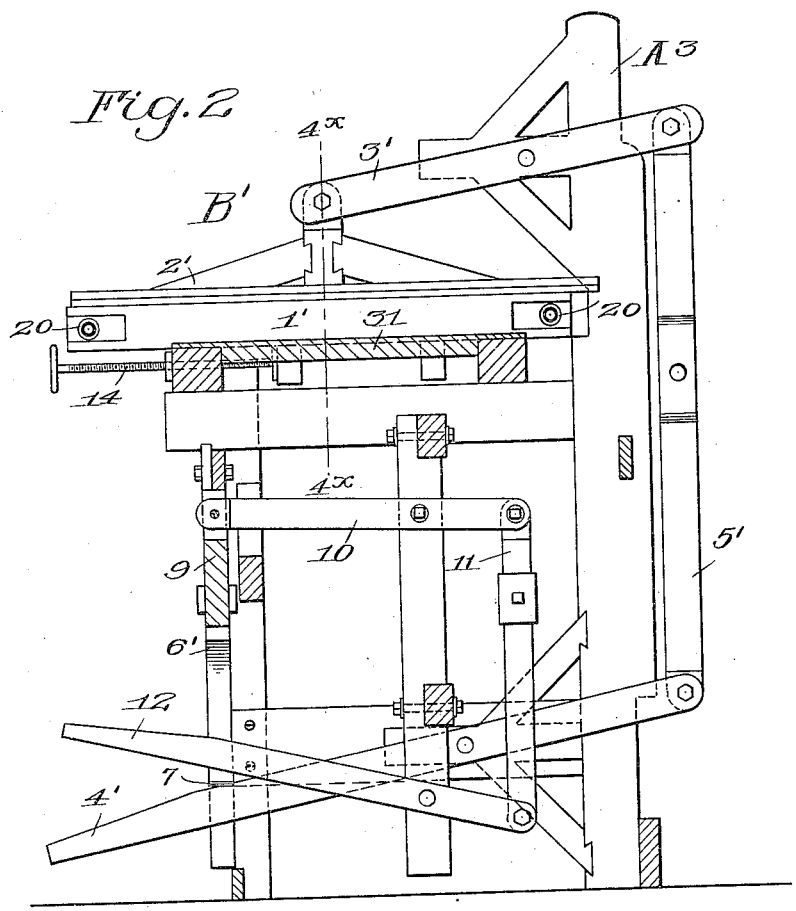

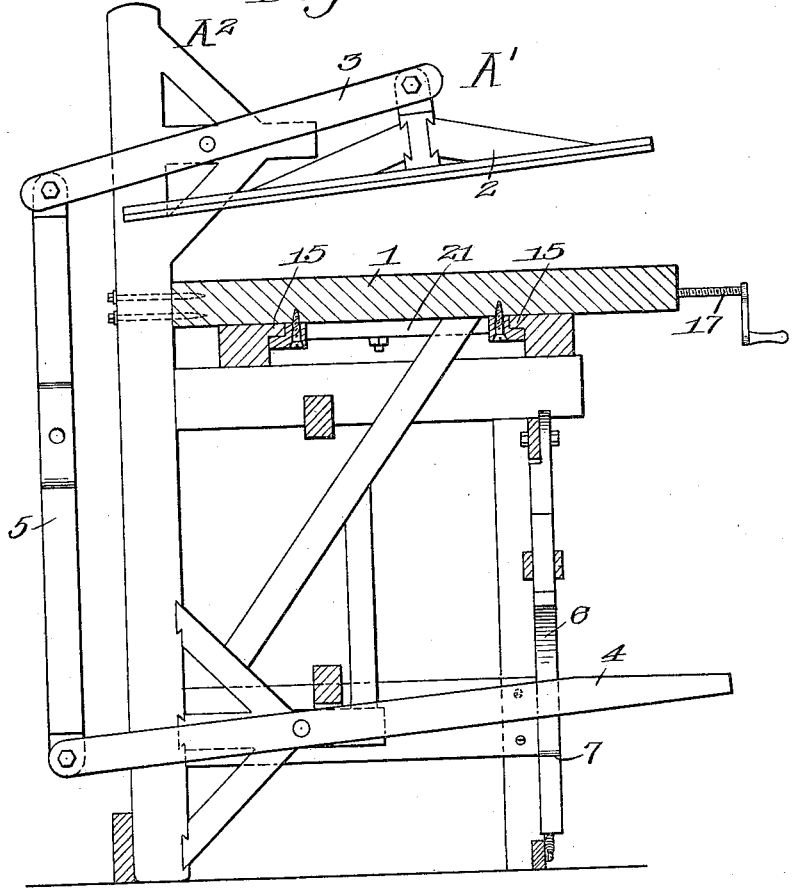

H. RUNNE.
VENEER JOINTING MACHINE.
APPLICATION FILED JULY 25, 1912. RENEWED AUG. 20, 1915.
1,154,730.
Patented Sept. 28, 1915.
4 SHEETS—SHEET 4.
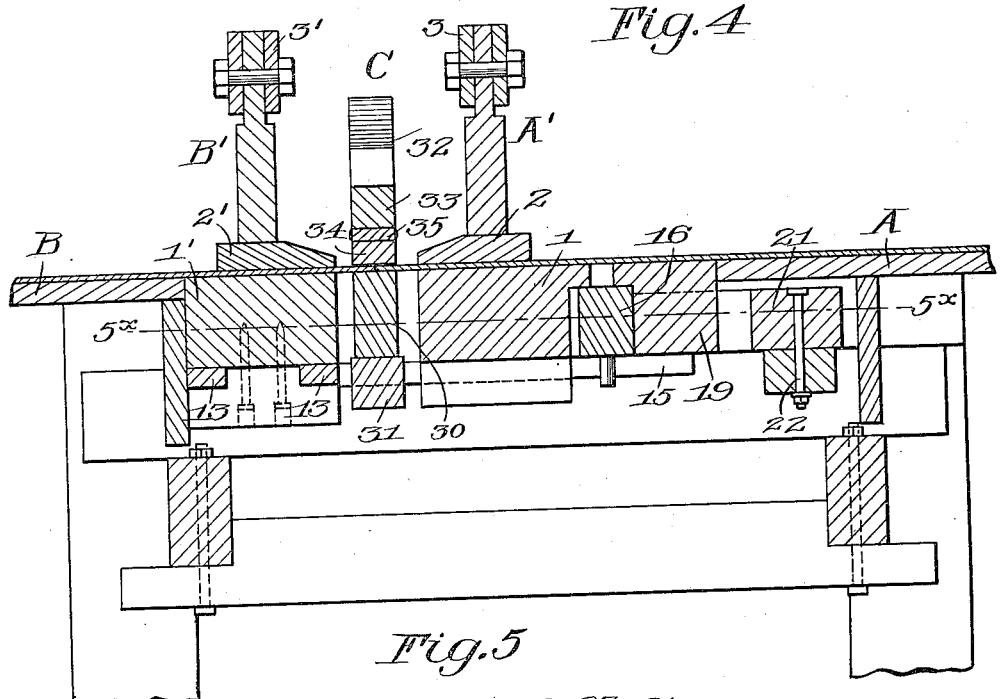
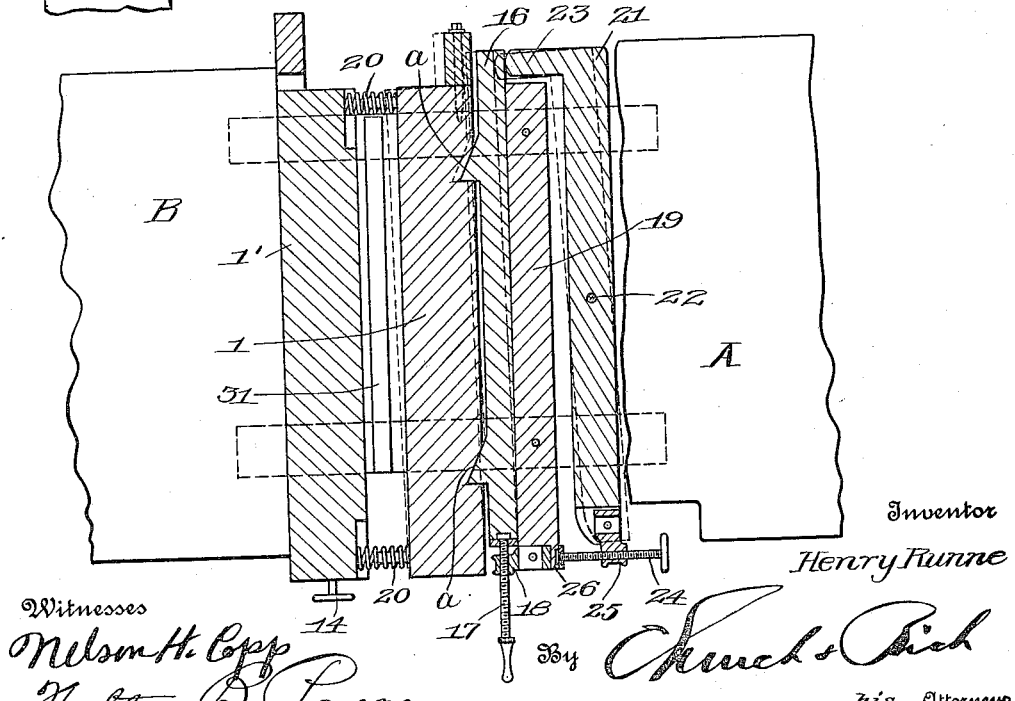
Witnesses
Nelson H. Copp
Walter D. Payne
Inventor
Henry Runne
By Church & Rich
his Attorneys

UNITED STATES PATENT OFFICE.

HENRY RUNNE, OF BROCKPORT, NEW YORK.

VENEER-JOINTING MACHINE.

1,154,730.  Specification of Letters Patent.  Patented Sept. 28, 1915.

Application filed July 25, 1912, Serial No. 711,480. Renewed August 20, 1915. Serial No. 46,527.

*To all whom it may concern:*

Be it known that I, HENRY RUNNE, of Brockport, in the county of Monroe and State of New York, have invented certain new and useful Improvements in Veneer-Jointing Machines; and I do hereby declare the following to be a full, clear, and exact description of the same, reference being had to the accompanying drawings, forming a part of this specification, and to the reference numerals marked thereon.

My present invention relates to apparatus for jointing strips of veneer and it has for its object to provide a machine of this character, which is adapted particularly to be used in forming butt joints between two pieces of veneer, that is, joints which are formed by bringing the separate pieces of the material together endwise of the grain of the wood. Generally speaking, the machine comprises two tables or supports between which are disposed the clamps which engage the separate pieces of the work, said clamps being movable relatively to each other whereby a perfectly tight joint may be formed across the entire width of the sheets, and said sheets may be adjusted to facilitate matching the grain of the two separate pieces of wood.

The invention also comprehends the use of a novel locking device interposed between the sheet clamps for the purpose of securing the sheets of veneer in their adjusted position and until the strip of adhesive material applied thereto has become thoroughly dry.

The invention further comprises a machine which is adapted particularly for rapid operation and control by a single operator, the parts being so arranged that the clamps may be actuated independently of each other by separate levers or treadles and the latter simultaneously released, after the joint has been adjusted and secured in the joint lock.

To these and other ends the invention consists in certain improvements and combinations of parts, all as will be hereinafter more fully described, the novel features being pointed out in the claims at the end of the specification.

In the drawings, Figure 1 is a front elevation of a machine illustrating one embodiment of my present invention; Fig. 2 is a transverse vertical sectional view taken on the line $2^x$—$2^x$ of Fig. 1; Fig. 3 is a similar view taken on the line $3^x$—$3^x$ of Fig. 1; Fig. 4 is an enlarged vertical detail sectional view taken on the line $4^x$—$4^x$ of Fig. 2; Fig. 5 is a horizontal sectional view taken on the line $5^x$—$5^x$ of Fig. 4, illustrating the means of adjusting one of the clamps longitudinally and rotatively; Fig. 6 is a detail side elevation of one of the veneer joint locks, and Fig. 7 is a detail plan view illustrating the type of joint between two sections of veneer formed by a mechanism embodying my invention.

Similar reference numerals throughout the several figures indicate the same parts.

My present invention is adapted particularly to be used in forming the end to end joints between separate strips of veneer used in all classes of furniture and woodwork. The veneers are thin sheets of wood, formed either by sawing or skiving thin sheets from a plank or log and they vary somewhat in length and breadth, depending upon the character of the wood from which the veneer is cut. When large sheets of veneer are required to cover a given surface, or when it is desired to obtain certain effects in graining for ornamentation, it is customary to joint several pieces together before applying the sheet as a whole to the backing or framework to which it is to be permanently secured. In the forming of butt joints the ends of the separate strips are cut on perfectly true lines and the separate strips are brought end to end and secured by a piece of adhesive material. In carrying out this operation, it has been customary in a great many cases to take the separate strips of veneer and tack them temporarily to a suitable board where they remained until the glue tape overlying the joint between said pieces becomes thoroughly dry. This method has its objections, chief of which is, that each strip of veneer is perforated with many tack holes, which cannot be closed so as to avoid detection in the finished product.

In carrying out my invention I employ a divided horizontal table and in the opening between the two ends of the table, I provide two independent work piece clamps which may be opened and closed and adjusted relatively so that the work pieces may be brought into juxtaposition by the operator and secured in the joint locking clamp and held in the desired position. Each of these clamps in independently movable relatively to the other and also in respect to the table top, thus permitting the veneer strips or work pieces to be brought closer together or separated as occasion may require, and also adjusted laterally of the table to facilitate the matching of the grain lines in the veneers. Again, one of the clamps is adjustable with a slight rotary movement whereby one of the veneer strips may be turned in one direction or another to facilitate the formation of a close joint throughout the entire width of the strips.

In illustrating my invention, I have shown the table as comprising the right and left hand portions A and B, mounted upon any suitable framework. These tables are arranged with their upper surfaces in the same horizontal plane, and between their proximate ends a sufficient space is provided to accommodate the clamps, indicated generally by A' and B', which latter are also separated a short distance to accommodate the veneer joint lock C. The clamps comprise bed pieces 1—1' and jaws 2—2', the bed pieces being carried on suitable supports extending between the ends of the tables and the clamps being suspended on levers 3—3', carried respectively on frame pieces A²—A³, both of which in the present embodiment of the invention, extend downwardly in rear of the table beneath which they carry the treadles or foot levers 4—4', by means of which the clamping members are operated, the said treadles being connected with the clamp levers by connecting rods 5—5'. The levers 4—4' extend forwardly to the front of the machine and coöperating with them are locking pawls 6—6', each provided with a suitable shoulder 7, beneath which the respective treadles engage. The pawls are operated in one direction by springs and are adapted to be separated to simultaneously release the treadles 4—4' and to this end they are provided with cam surfaces 8—8' with which coöperates a wedge block 9. The latter is carried on the end of a pivoted arm 10, and is operated by a connecting rod 11 attached to the treadle 12, which is located intermediate the treadle 4—4' as shown in Figs. 1 and 2.

The bed block 1' of the clamp B' is movable transversely of the table B and for this reason it is supported upon the guides 13 as seen in Fig. 4, and at the forward end it is provided with an adjusting screw 14 by means of which the clamp as a whole, may be moved in a transverse direction to facilitate the adjustment of one work piece or strip of veneer, forwardly or rearwardly on the table relatively to the coöperating strip of veneer secured in the other clamp A'.

The formation of a perfect joint, especially a butt joint, between two pieces or strips of veneer, makes it necessary that the separate work pieces be brought together under pressure which is equal throughout the entire width of the strips and in order to accomplish this, I provide for further adjustment of one of the clamps, preferably the clamp A'. The bed 1 of this clamp is mounted upon longitudinal guides 15 located beneath the end of the table A, along which the clamp may be moved by any suitable adjusting mechanism. However, as the movement required is slight, seldom exceeding more than ⅛ or ¼ of an inch, I provide in rear of the bed 1, inclined cam surfaces $a$, with which coöperate corresponding projections on a sliding member 16. This adjusting member 16 may be moved by a screw 17, operating in a nut 18, carried on a stationary portion or abutment 19 of the frame. Springs 20 are arranged between the bed pieces 1 and 1', serving to keep these parts normally separated and also holding the bed 1 against the slide 16 and crowding the latter against the abutment 19. Rotary movement is provided for the clamp A'—by mounting a rocking lever 21 on a pivot 22 and providing it with a projection 23, coöperating with the rear end of the slide 16. At the forward end of the rocking lever 21 there is provided an adjusting screw 24, passing through a nut 25 on said lever and engaging the presser plate 26 on the forward end of the abutment 19, thus, when it is necessary to rotate or twist the work piece or veneer sheet held in the clamp A', this may be done by adjustment of the screw 24, which when turned in one direction or the other will cause the slide 16 to be moved at an angle to the proximate side of the abutment 19, as shown in dotted lines in Fig. 5.

On account of the dual adjustment provided for the clamp A', the framework A² is secured directly to the bed 1' of the clamp, so that the frame will follow the movement of the clamp, without straining or distorting the latter.

In Fig. 6, I have shown in side elevation, the joint lock which is used for holding the adjacent ends of the two pieces of veneer, after they have been secured and during the time that the binding strip or adhesive tape is drying. This clamp comprises the bed piece 30, which is normally supported on a cross strip 31, as shown in Fig. 4, so that its upper surface lies in the plane of the work bench or table top. At its rear end the bed piece is provided with an upwardly extending hook shaped projection 32, beneath which engages the rear end of a compression strip 33, carrying the pressure bar 34, said parts being separated and capable of slight movement by strips of india rubber 35—inserted between them. The forward end of the bed strip 30 is cut away at each side, providing a tongue on which is pivoted the side pieces of a yoke 36, which may be turned down when not in use, and when the compression strip is inserted, it may be elevated as shown in Fig. 6, to receive the ends of said strips 33 and the bar 34, which latter will be crowded down into operative position by the action of a cam member 38.

The operation of my veneer jointing machine will now be readily understood. The clamps A′ and B′ being released the clamping member 2—2′ are automatically elevated to the open position shown in Fig. 3. The operator then selects the work pieces or strips of veneer and positions one of them on the table B between the clamping members of the clamp B′ with its extremity lying in central position in respect to the joint lock C; pressure upon the treadle 4′ will then close the clamping member 2′ against the bed 1′. The second veneer strip or work piece is then brought into position on the table A, between the parts of the clamp A′, with its end abutting, or in juxtaposition to, the end of the first mentioned work piece, when the clamp A′ is then closed by movement of the treadle 4. The work pieces or veneer strips being arranged as described, the operator may then observe their position, and if necessary, shift one of them transversely relatively to the other to effect a better matching of the pattern in the grain, by turning the hand screw 14 in order to move the parts of the clamp B′ in a direction transversely of the table. To obtain a perfectly tight joint throughout the entire width of the work pieces, the operator adjusts the screw 17 and advances the work piece held in the clamp A′ and if necessary he turns the adjusting screw 24 and swings said work piece lengthwise until it is accurately positioned in respect to the other strip. To the upper surface of the work pieces, the customary binding tape, which may be a strip of gummed paper or adhesive fabric, is applied and pressed into position and firmly held until dried, by the joint lock, illustrated in Fig. 6. The joint being completed the attached sheets of veneer are removed when the operator depresses the treadle 14, and simultaneously releases the pawls 6—6′ permitting the clamps A′ and B′ to automatically open.

I claim as my invention:

1. In a veneer jointing machine, the combination with two tables arranged in horizontal alinement and two supporting work clamps located between the tables, of means for bodily adjusting one of said clamps relatively to the other in a direction transversely of the tables.

2. In a veneer jointing machine, the combination with two separated supports, and separate clamps arranged between them, each adapted to receive a strip of veneer, and having parts movable to engage and disengage said strips, of treadles connected to said movable parts, means for locking the treadles in operative position, and means for simultaneously releasing said treadles.

3. The combination of two clamps adapted to hold separate sheets of veneer with their ends in juxtaposition, of means for adjusting said clamps relatively to each other, to swing the veneer sheets to bring their abutting ends into parallelism, move said sheets longitudinally to cause their adjacent ends to abut, and to effect a transverse shifting movement of one of said sheets relatively to the other, for the purpose of matching grain marks in the respective sheets.

4. In a veneer jointing machine, the combination with a suitable frame, of two veneer sheet clamps, comprising stationary and movable members, treadles on the frame, and connections between the latter and the movable members of the clamps extending in rear of the frame, latch members coöperating with said treadles for holding the clamps in closed position and means for simultaneously releasing said treadles to permit said clamps to open.

HENRY RUNNE.

Witnesses:
G. W. KIRKPATRICK,
S. R. SNOOK.